United States Patent [19]

Lautzenhiser

[11] 4,155,251

[45] May 22, 1979

[54] LASER FORCE-MEASURING SYSTEM BIASING

[75] Inventor: Theodore V. Lautzenhiser, Tulsa, Okla.

[73] Assignee: Standard Oil Company (Indiana), Chicago, Ill.

[21] Appl. No.: 910,931

[22] Filed: May 3, 1978

[51] Int. Cl.$^2$ .................... G01F 1/24; G01P 15/08; G01V 7/04
[52] U.S. Cl. .................... 73/141 A; 356/350; 73/382 R; 73/517 R; 331/DIG. 1; 356/33
[58] Field of Search ............ 73/382, 516 R, 517 R, 73/141 A; 331/94.5 M, DIG. 1; 356/33, 106 LR

[56] References Cited

U.S. PATENT DOCUMENTS 3,786,681  1/1974  Kiehn .................................. 73/382
3,927,946  12/1975  McClure .............................. 356/106

Primary Examiner—Herbert Goldstein
Attorney, Agent, or Firm—Arthur McIlroy

[57] ABSTRACT

A biasing element for use in a force-measuring system employing a circularly polarized ring laser. The biasing element is a pre-stressed photoelastic element placed in the path of the laser beam to generate a steadystate frequency difference at the output of the beat detector. In a preferred form, the biasing element is pre-stressed by bonding to a second photoelastic element and a second ring laser is positioned to detect the torque in the second element to allow monitoring of any changes in the bias level.

9 Claims, 1 Drawing Figure

U.S. Patent
May 22, 1979
4,155,251
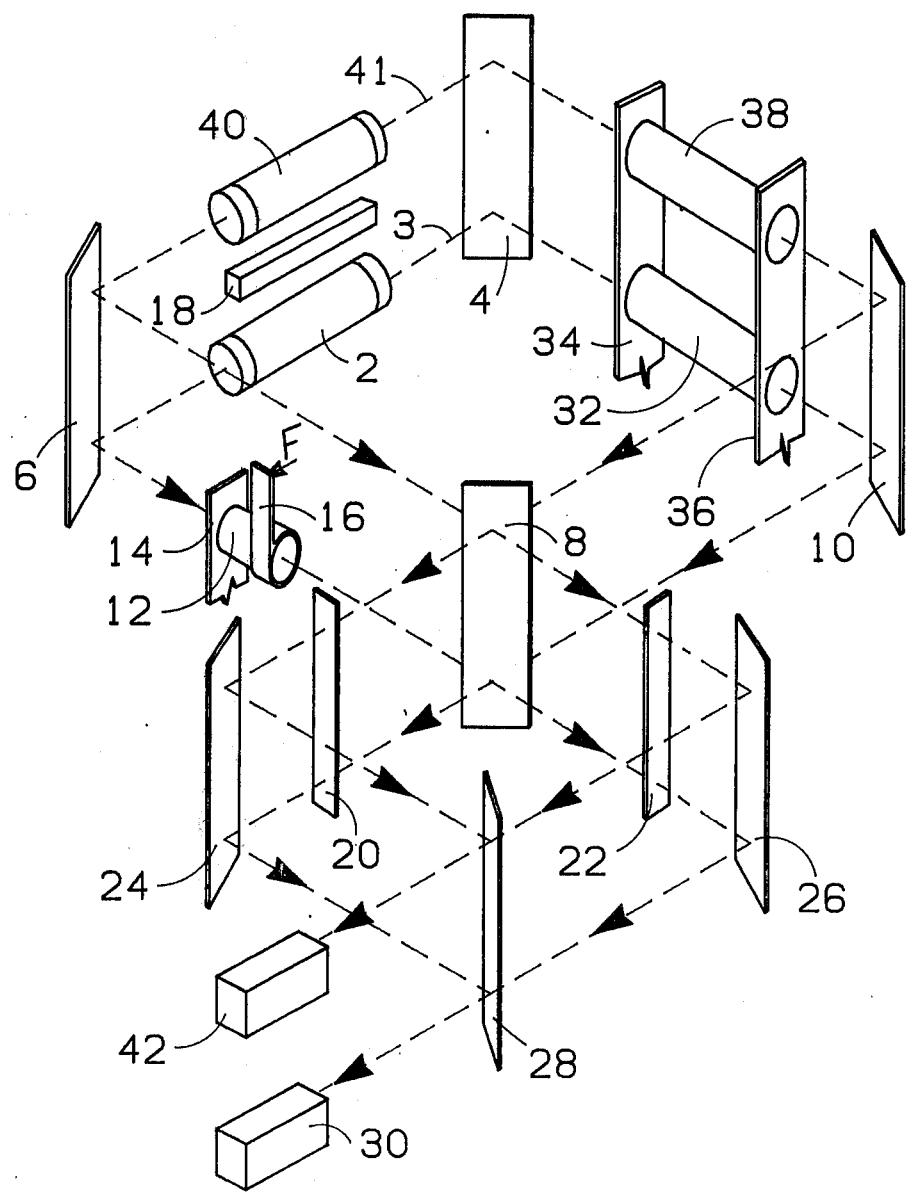

LASER FORCE-MEASURING SYSTEM BIASING

BACKGROUND OF THE INVENTION

This invention relates to force-measurement devices using circularly polarized laser beams and more particularly to a biasing element for improving the operation of such devices.

The reference believed to be most relevant to the present invention is U.S. Pat. No. 3,786,681, issued to Kiehn, on Jan. 22, 1974, entitled "Electromagnetic Wave Modulation and Measurement System and Method." This patent discloses a preferred embodiment comprising a ring laser in which the laser beams have at least two different circular polarization modes. A modulator element comprising a quartz rod is positioned so that the laser beam travels the length of the rod. When a torque is applied to the rod, the two circular polarization modes change frequency differentially to provide a frequency difference proportional to the torque. In a gravimeter configuration, the torque is generated by suspending a mass on the end of an arm which is attached to one end of the quartz rod.

As noted in that patent, this force-measurement system is linear for forces above some level. Near the zero force level, where the two polarization modes have essentially the same frequency, there is believed to be a phase-locking effect which resists the change in frequency caused by the applied force. It is suggested in the patent that the discontinuity can be avoided by applying a bias force to the pressure-sensing element or by pre-stressing the element or by careful design of the coatings on the mirror and window surfaces making up the laser cavity. No specific method for applying the bias force or prestressing the modulating element is given, even though it is clear that any such arrangement adds to the desired signal and that it is essential that the bias level be absolutely constant or at least be known so that it may be separated from the desired signal.

When the apparatus described in the patent is used as an accelerometer for detecting horizontal acceleration, it is clear that the apparatus would tend to be biased at a zero beat frequency when there is no horizontal acceleration. When used, for example, in an aircraft to detect right and left acceleration, a device biased at zero beat frequency for zero acceleration would not be able to distinguish between right and left acceleration but would only give the amplitude of the acceleration. To provide the directional indication, a bias level at least as large as the maximum acceleration level to be detected must be provided, and it is important to know what that bias level is so that, for example, signals larger than the bias level could indicate a right turn acceleration while signals less than the bias level could indicate a left turn acceleration.

Accordingly, an object of the present invention is to provide a biasing element for a ring laser force-measurement system which provides a constant known level of bias.

A second object of the present invention is to provide a bias arrangement for a ring laser force-measurement system in which the bias level may be independently monitored without interference with the primary force-measurement system.

A bias element according to the present invention comprises a photoelastic element having a longitudinal axis aligned with and in the path of a laser beam in a force-measurement system. The biasing element is bonded at its ends to a stressing element with the biasing element and the stressing element pre-stressed prior to the bonding step. In a preferred form, the stressing element is made of the same material as the biasing element and a second ring laser is used to monitor the bias level by passing a laser beam through the stressing element.

BRIEF DESCRIPTION OF THE DRAWING

The drawing illustrates a dual ring laser force-measurement system incorporating a biasing element according to the present invention.

DESCRIPTION OF THE PREFERRED EMBODIMENT

The drawing illustrates a dual ring laser arrangement in essentially the same manner as illustrated in the above-referenced U.S. Pat. No. 3,786,681. The elements making up the basic force-measurement system will be described first. A ring laser comprises a laser amplifier tube 2 and mirrors 4, 6, 8, and 10 forming a cavity for a beam 3. Mirror 8 is partially transmissive to allow part of the beam 3 to pass through to a detecting system. Within the ring laser cavity is a modulator element 12 bonded at one end to a support 14. A lever 16 is bonded to the other end of the modulator element 12 so that when a force indicated by the arrow, labeled "F," is applied, the element 12 will be torqued and will differentially modulate circular polarization modes of the laser beam. Circular polarization of the beam may be insured by the use of a magnet as indicated at 18 or by other known methods. The portions of the beam 3 leaving the ring laser cavity by passing through mirror 8 pass through polarizers 20 or 22 and are reflected from mirrors 24 or 26 before being recombined at beam splitter 28. The combined signals from beam splitter 28 are received by a beat detector 30 which provides an output indicating the frequency difference between the laser beam polarization modes. This frequency difference is an indication of the force F applied to modulator element 12.

The remaining elements illustrated in the FIGURE comprise the improvement of the present invention. In particular, within the force-measurement ring laser cavity is provided a pre-torqued biasing element 32. Element 32 has a permanent torque applied to it at the time it is bonded to support elements 34 and 36 so that it always causes a frequency difference in the various polarization modes of the laser beam. In this way, the beat signal output from detector 30 always contains the sum of a signal indicating the force F applied to element 12, plus the steadystate bias beat frequency caused by element 32. Element 32 is preferably a quartz rod essentially the same as modulator element 12.

While the supports 34 and 36 may be attached to any rigid support structure which would resist the torque applied to rod 32, it is preferred that the torque resistance be provided by attaching the supports to a second quartz rod 38 essentially identical in dimensions to rod 32. In this case, only one of the two supports 34 or 36 would actually be attached to the housing containing the force-measurement system. As a result, any torque in rod 32 would be resisted by rod 38 which would therefore experience the identical level of torque but with opposite direction. If both rods 32 and 38 are of the identical material, for example, quartz, and have essentially the identical dimensions, the rod 32 should provide a stable bias level to the force-measurement system and not be affected by temperature variations or other sources of error.

While amorphous quartz is the preferred material from which elements 12, 32, and 38 are made, it is clear that other materials may be substituted. As noted in U.S. Pat. No. 3,786,681, other photoelastic materials which exhibit force-responsive birefringent effects may also be used.

Since ultimate precision is required in most systems in which a laser-based force detector would be used, it is preferred that a second ring laser be used to detect the actual torque which is experienced by bias element 32 during the operation of the force-measurement system. This is accomplished by adding a second laser amplifier tube 40 positioned to form a second ring laser cavity within the mirrors 4, 6, 8, and 10, with a beam 41 passing through the stressing element 38. A second beat detector 42 is arranged to receive a portion of the beam 41 which passes through mirror 8, polarizers 20 and 22, mirrors 24 and 26, and beam splitter 28 to form a beam having a beat frequency proportional to the torque experienced by stressing element 38.

As illustrated in the FIGURE, the number of elements required to add the second ring laser is greatly reduced by simply using mirrors which are large enough to accommodate both laser beams. Since the beams can be confined to a small diameter, this should not involve a significant increase in size of the element. It would also be possible to pass the beam 41 through biasing element 32 itself without interfering with beam 3. This can be done either by physical separation of the paths of beams 3 and 41 through element 32 or by use of different frequencies for beams 3 and 41 with separation accomplished by filters. The arrangement illustrated in the drawing is believed to be more practical and is therefore preferred.

In use, the output of the second beat detector 42 may simply be monitored as an indication that the biasing element has remained unchanged and has not been affected by any sources of error. If the output of beat detector 30 is recorded, for example, on a stripchart recorder, the output of beat detector 42 can be recorded alongside it so that any unusual variations in the force measurement might be correlated with changes in the biasing element. As an alternative, the output of beat detector 42 may simply be subtracted from the output of beat detector 30 to arrive at a net beat frequency proportional only to the force F applied to modulator element 12. In certain situations, the output of beat detector 42 may indicate that the biasing arrangement as illustrated is stable enough that monitoring is not worthwhile. In such cases, the extra laser amplifier 40 and beat detector 42 could be dispensed with in reliance on the inherent stability of the biasing element or could be used only during the initial calibrations and then removed from equipment intended for field use to reduce the costs.

While the present invention has been shown and illustrated in terms of specific apparatus, it is apparent that various modifications and changes can be made within the scope of the present invention as defined by the appended claims.

I claim:

1. In a force-responsive measurement device of the type having a laser for generating a laser beam having a plurality of circular polarization modes, a modulator comprising a photoelastic element for differentially altering the characteristics of said polarization modes in response to the application of a stress, means for applying a torque proportional to said force to said modulator and stressing said modulator about the axis of the laser beam to produce a frequency difference between said modes, and means for detecting said frequency difference, the improvement comprising:

a biasing element positioned within the path of the laser beam, said biasing element consisting of photoelastic material pre-stressed by application of a permanent torque where the axis of the torque is parallel to the axis of the laser beam, whereby said biasing element causes an essentially constant frequency difference between the polarization modes in addition to that caused by said force and causes said device to operate in a linear response range.

2. A device as in claim 1 in which said laser beam generator includes a laser tube and at least three reflectors forming a ring laser cavity for said tube.

3. A device as in claim 1 in which said laser beam generator is a gas laser tube.

4. An improved force-responsive measurement device according to claim 1 wherein said biasing element is pre-stressed by being permanently bonded to a stressing element comprising photoeleastic material and further including a second laser beam generator for generating a second laser beam having a plurality of circular polarization modes positioned so that said second beam passes through said stressing element along the axis of the torque applied to said stressing element, so that said stress produces a frequency difference between said modes, and also further including a second means for detecting the frequency difference between the polarization modes of said second beam.

5. A device as in claim 4 in which said second laser beam generator includes a laser tube and at least three reflectors forming a ring laser cavity for said tube.

6. A device as in claim 4 in which said second laser beam generator is a gas laser tube.

7. An improved force-responsive measurement device according to claim 1 wherein said biasing element is pre-stressed by being bonded to a stressing element consisting of the same photoelastic material as said biasing element and having essentially the same dimensions as said biasing element, whereby the level of stress in said biasing element is constant over a range of environmental conditions.

8. An accelerometer comprising a force-responsive measurement device as in claims 1, 4 or 7, a body having mass, means for supporting said body and said modulator, and means for converting the acceleration force of said mass into said force.

9. A gravimeter comprising a accelerometer as in claim 8 arranged so that the force of gravity acts on said body to develop said force.

* * * * *